ELECTROMAGNETIC RELAY

Filed June 29, 1955 5 Sheets-Sheet 1

INVENTORS
GUSTAF ADOLF PETTERSSON
PAUL KORNFELDT
BY [signature]
ATTORNEY

INVENTORS
GUSTAF ADOLF PETTERSSON
PAUL KORNFELDT
BY [signature]
ATTORNEY

Oct. 28, 1958 G. A. PETTERSSON ET AL 2,858,488

ELECTROMAGNETIC RELAY

Filed June 29, 1955 5 Sheets-Sheet 3

INVENTORS
GUSTAF ADOLF PETTERSSON
PAUL KORNFELDT
BY [signature]
ATTORNEY

INVENTORS
GUSTAF ADOLF PETTERSSON
PAUL KORNFELDT
BY Frederick L. Haus
ATTORNEY

INVENTORS
GUSTAF ADOLF PETTERSSON
PAUL KORNFELDT
BY [signature]
ATTORNEY

United States Patent Office 2,858,488

Patented Oct. 28, 1958

2,858,488

ELECTROMAGNETIC RELAY

Gustaf Adolf Pettersson, Stockholm, and Paul Kornfeldt, Linkoping, Sweden

Application June 29, 1955, Serial No. 518,872

Claims priority, application Sweden February 19, 1955

12 Claims. (Cl. 317—198)

The present invention relates to electromagnetic switches or relays, and more particularly to electromagnetic relays used in telephone communication systems.

Electromagnetic relays play an important part within the field of communication. The great number of components of this kind which for example are used in an automatic telephone station, entails that any fault occurring in these relays in respect of construction or operation is multiplied many times and influences the technical and economical effect of the whole system. Two essential factors to be considered in the construction of relays are the space occupied by a relay and the consumption of current necessary for their operation. If the dimensions of the relays can be reduced, material and space will be saved, whereby the stands, for instance of telephone stations, can be made smaller and more easily accessible. The consumption of current of the relays can be reduced by eliminating to the greatest possible extent losses, for example due to leakage, and by giving the magnetic field between the magnet core and the armature an optimal shape and strength. At the same time, all other demands normally made on the functions of the relay, such as the lifting force of the armature, must of course also be satisfied, including sufficient margins of performance.

The required demands on electromagnetic relays have hitherto largely been satisfied empirically, that is, by establishing by means of control measurements the performance of relays of varying shapes and dimensions of certain parts, for example of magnetic core and armature. Apart from the fact, that such trial and error methods are uneconomical, they do not produce exact technical data for different requirements, and the obtained data will be more or less accidental.

One of the objects of the present invention is to substitute for the heretofore used trial and error methods a definite rule of calculating the lifting force K of a relay armature as a function of factors determining the magnitude of the force, such as, for example, the distance between the turning axis of the armature and the point of application of the force on the relay contacts, the ampere turns of the coil or coils, the maximum air gap between the armature and the core and the reluctance of the magnetic circuit.

In order to be able to obtain a general equation of this kind an expression must first be found for length of the paths of the flux lines of force in the iron ($S_j$) and in air ($S_1$), and for the torque M acting upon the armature of the magnet. Thereafter equations may be developed for the lifting force K due to the action of the iron circuit. In addition, different ways of arranging the armature in relation to the core of the magnet must be considered.

The new rule according to the invention is explained in conjunction with the accompanying drawings showing a generally conventional electromagnetic relay of the flat armature type.

Figures 3A, 3B:
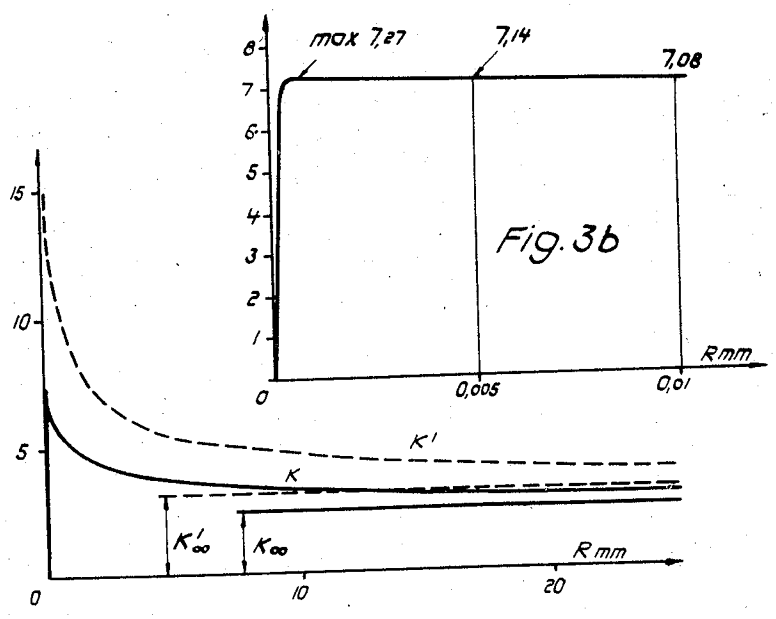

Figs. 3*a* and 3*b* are graphs showing curves representing the lifting force of an armature as a function of the distance (R) of the armature from its turning axis in a practical case, the curve K′ of Fig. 3*a* representing the conditions present when the reluctance in the iron circuit is neglected and the curve K representing the conditions when the reluctance of the iron circuit is not neglected.

Fig. 3*b* shows the zero end of curve K, the scale of R being greatly enlarged.

Figure 4:
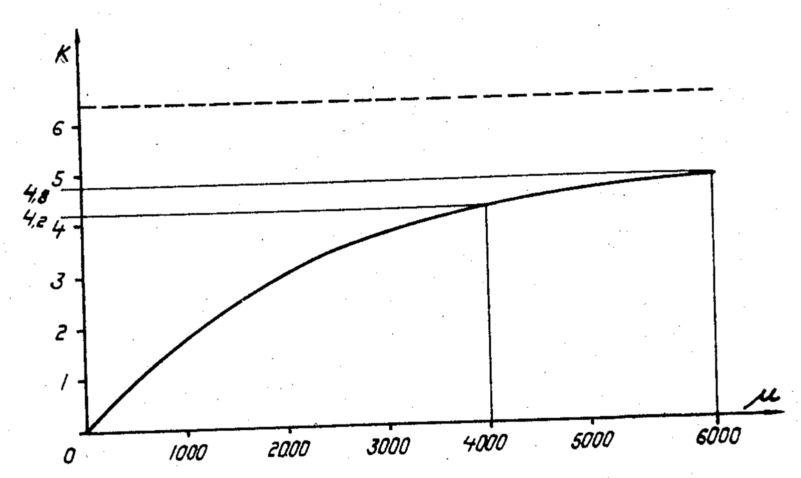

Fig. 4 is a graph showing a curve of the lifting force of an armature as a function of the permeability of the magnetic material.

Figure 5:
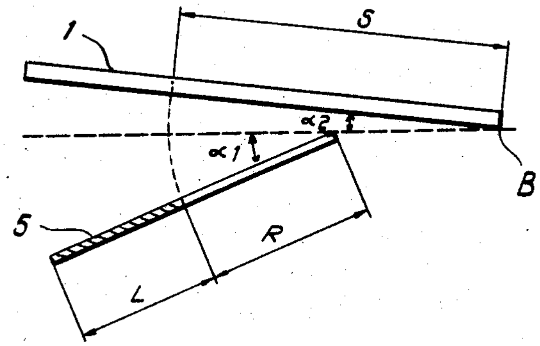

Fig. 5 is a diagrammatic elevational side view of a relay with a permanent air gap between the armature and core.

Figure 2:
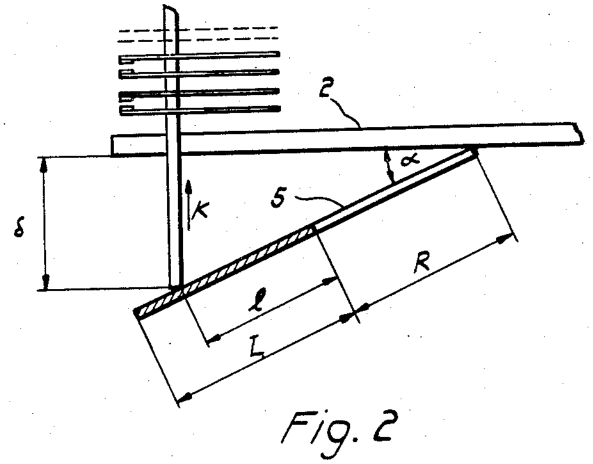
Fig. 2 is a diagrammatic elevational side view of the relay according to Fig. 1.
Figure 6:
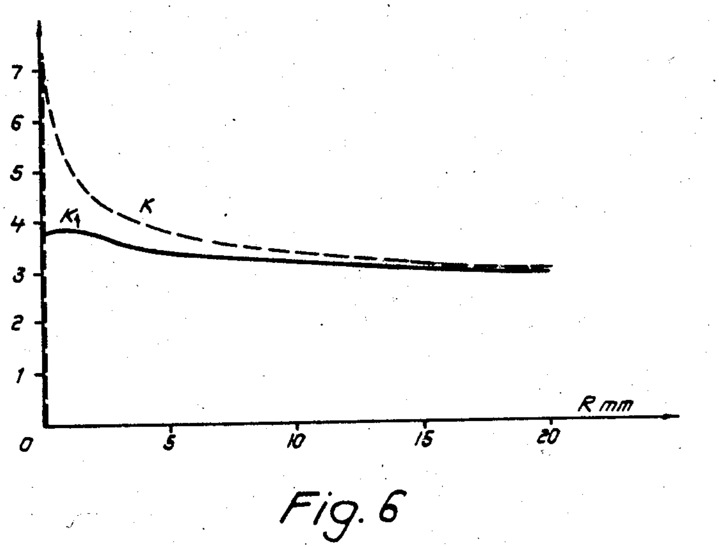

Fig. 6 is a graph showing comparative curves of the lifting force of an armature as a function of the distance from the turning axis for the relay according to Fig. 2 and Fig. 5 respectively.

Figure 7:
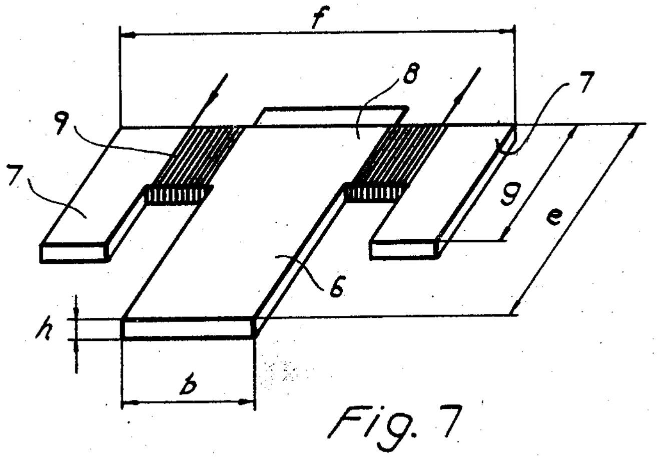

Fig. 7 is a diagrammatic isometric view of a magnet core of a novel relay design.

Figure 8:
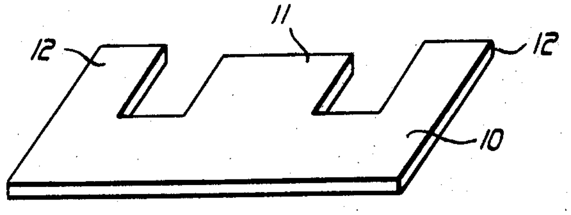

Fig. 8 is an isometric view of a novel armature.

Figure 9:
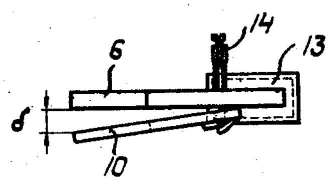

Fig. 9 is side view of a core according to Fig. 7 and an armature according to Fig. 8, which form a relay according to the invention.

Figures 10, 11:
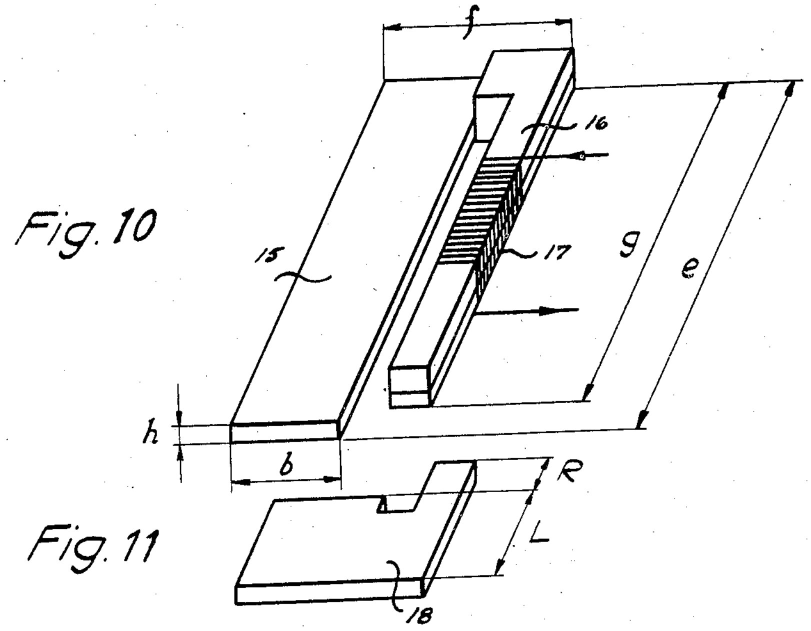

Fig. 10 is another embodiment of a magnet core.

Fig. 11 is the armature for the magnet core according to Fig. 10.

Figure 12:
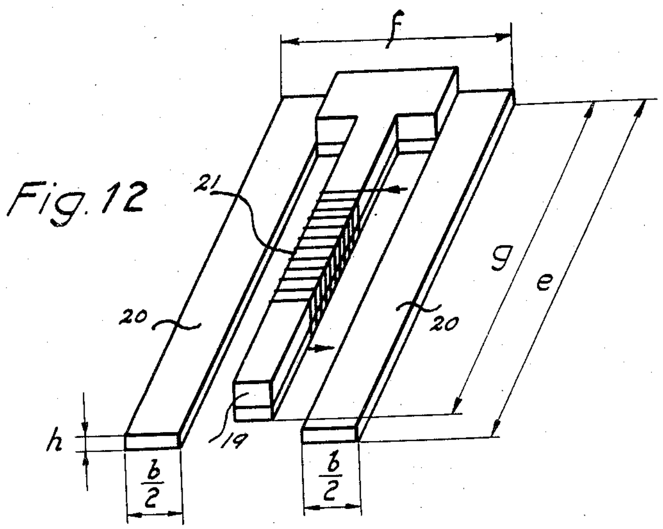

Fig. 12 is still another embodiment of a magnet core, and

Figure 13:
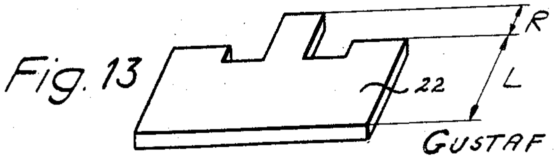

Fig. 13 is the armature for the magnet core according to Fig. 12.

As previously stated, an expression must first be developed to define the paths of the force lines in iron and air respectively. The subsequent calculation is made in connection with a flat armature relay according to Fig. 1, in which reference numerals 1 and 2 designate the two branches of a relay structure. This structure is magnetically equivalent to a magnetic core with three branches or legs, in which the area of the central branch is twice the area of each of the outer branches. Reference numeral 3 designates the transverse member (the yoke) which in the equivalent circuit connects the branches. The flat armature of the relay has a transverse portion 4 and a longitudinal branch 5. The armature is shown in the non-operative position and forms an angle $\alpha$ with the general plane of the magnet core.

The path of the lines of force through the relay is indicated by a dashed line extending through the rear part of branch 1, branch 5 of the armature, portion 4 of the armature, a dash and dot line extending through the air gap, and a dashed line extending through branch 2, yoke 3 and again through branch 1.

I. *Determination of the paths of the lines of force*

To calculate the paths of the lines of force an equivalent path of the lines of force through the iron is preferably introduced consisting of the path in the branches 1 and 2. The path of the lines of force in the iron consists of two parts, namely the path in the core of the relay and the path in the armature. The former is entirely dependent upon the dimensions of the core and the latter is dependent upon the distribution of flux in the air gap.

When, along the length of the armature a coordinate $\rho$ of position is introduced as measured from the datum line O, one may, for sake of simplicity, calculate a value for the ordinate $\rho$ corresponding to the center of the lines of forces in the operative part 4 of the armature, such a value of $\rho$ is denoted by $L_1$, and thus one half the flux may be considered to leave the armature and cross the air gap along the distance $O-L_1$ and the other half to cross between $L_1$ and L. The point $L_1$ is determined through an equation:

$$L_1=\sqrt{R(R+L)}-R$$

wherein R is the distance between the turning axis and the edge of the armature as shown in Fig. 2.

$L_1$ varies between 0 and $L/2$, when R increases from 0 to infinity. That $L_1=0$ when $R=0$ appears directly from the equation. This condition corresponds to a magnetic short circuit, the whole flux passing through the point of contact between the armature and the core. For $R=\infty$ the armature and the core are parallel whereby the density of flux is constant in the air gap. This signifies that the total flux leaves the armature partly at the center.

Figure 1:
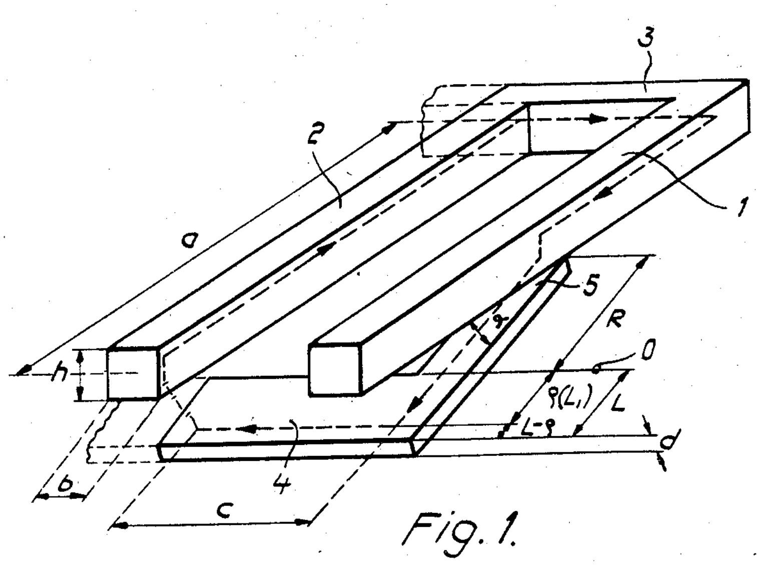
Fig. 1 is a diagrammatic isometric view of the magnet core and the armature of a conventional flat armature relay, the paths of the lines of force being indicated.

In accordance with the references indicated in Fig. 1 the following expression is obtained for the length of the paths of the lines of force in iron ($S_j$) and air ($S_l$) respectively.

$$S_j=2\left(a-L+c+\frac{h}{2}+\frac{d}{2}+L_1\right)=2(D+L_1)$$

and $$S_l=(R+\rho)\alpha$$

where $(D+L_1)$ is half the path of the lines of force in iron.

If the magnetic leakage is neglected the flux in air must equal the flux in the iron.

II. *Determination of the torque M acting upon the armature of the magnet*

The specific surface force acting upon the magnet is:

$$t=\tfrac{1}{2}B_lH_l=\tfrac{1}{2}\mu_0H_l^2$$

$B_l$ being equal to the magnetic density of flux, $H_l$ being equal with the density of ampere turns, and $\mu_0$ being a constant factor in the MKS system equal to $4\pi10^{-7}$.

The force acting on a surface element having the width $b$ and the length $d\rho$ is:

$$dT=\tfrac{1}{2}\mu_0H_l^2bd\rho$$

Its moment is:

$$dM=\tfrac{1}{2}\mu_0H_l^2b(R+\rho)d\rho$$

The total moment is obtained by integration between the limits 0 and L $$M=\frac{b\mu_0}{2}\cdot\frac{(IN)^2\log\frac{R+L}{R}}{\left[\frac{2b(D+L_1)}{\mu A_j}\log\frac{R+L}{R}+\alpha\right]^2}$$

where IN is the number of ampere turns, $\mu$ is the permeability of the iron, $A_j$ is the cross section of the iron and D is substituted for $(a-L+c+h/2+d/2)$.

If a certain maximum air gap $\delta$ is fixed at a distance of such a length that the lifting stud lifting the relay contacts can carry out the functions intended, $\alpha$ will be a function of R:

$$=\frac{\delta}{R+l}.$$

III. *Determination of the lifting force K of the armature on the lifting stud of a relay with an air gap according to Fig. 2*

The lifting force K is obtained by dividing the moment M by the distance $(R+l)$ between the turning axis of the armature and the lifting stud of the relay. Then the equation will be as follows:

$$K=\frac{b\mu_0(IN)^2}{2(R+l)}\cdot\frac{\log\frac{R+L}{R}}{\left[\frac{2b}{\mu A_j}(D+L_1)\cdot\log\frac{R+L}{R}+\frac{\delta}{R+L}\right]^2}$$

IV. *Determination of the lifting force K′ of the armature when the reluctance of the iron circuit is neglected*

In order to be able to neglect the effect of the reluctance of the circuit, the magnetic reluctance of the iron circuit must be small as compared with that of the air gap. This is the case when the permeability is very great. When $\mu=\infty$, the equation is:

$$K'=\frac{b\mu_0(IN)^2}{2\delta^2}\cdot(R+l)\log\frac{R+L}{R}$$

when $R=0$, $K'=\infty$ and decreases thereafter asymptotically with increasing values for R towards $$K'=\frac{b\mu_0(IN)^2}{2\delta^2}\cdot L$$

when $R=\infty$.

V. *Calculation of a lifting force K on a contact spring group as the function of a distance R for a practical case with introduction of numerical values*

As the expression for the force K is difficult to treat mathematically and a general determination of extreme values, if any, therefore will be complicated, a special case will be treated as an illustration in which numerical values have been inserted in the formula for K obtained in Example III. Then the following figures are obtained, reference being made to Figs. 1 and 2.

| | |
|---|---|
| $IN=175$ A. T. | $a=74.5\cdot10^{-3}$m. |
| $L=15\cdot10^{-3}$m. | $b=7.0\cdot10^{-3}$m. |
| $l=14\cdot10^{-3}$m. | $c=17.0\cdot10^{-3}$m. |
| $A_j=49\cdot10^{-6}$m.$^2$ | $d=2.5\cdot10^{-3}$m. |
| $\mu=4000$ | $h=7.0\cdot10^{-3}$m. |
| $\delta=0.8\cdot10^{-3}$m. | $D=81.25\cdot10^{-3}$m. |

All values are given in the MKS-system. The unit of force in this system is 1 newton (1 n.=102 gms.).

The result will be seen from the table below and Figs. 3*a* and 3*b*, the distance R being the abscissa and the force K the ordinate.

| Part of length of armature (in cm.) R | Torque M | Armature force on lifting stud (in newtons) K |
|---|---|---|
| 0 | 0 | 0 |
| $0.1\cdot10^{-3}$ | $92.1\cdot10^{-3}$ | 6.45 |
| $0.5\cdot10^{-3}$ | $82.0\cdot10^{-3}$ | 5.57 |
| $1\cdot10^{-3}$ | $76.9\cdot10^{-3}$ | 5.08 |
| $2\cdot10^{-3}$ | $73.1\cdot10^{-3}$ | 4.52 |
| $5\cdot10^{-3}$ | $73.5\cdot10^{-3}$ | 3.83 |
| $10\cdot10^{-3}$ | $80.9\cdot10^{-3}$ | 3.36 |
| $20\cdot10^{-3}$ | $103.8\cdot10^{-3}$ | 3.04 |
| $30\cdot10^{-3}$ | $128.0\cdot10^{-3}$ | 2.91 |
| $\infty$ | $\infty$ | 2.52 |

VI. *Determination of the maximum value of the force K as a function of the distance R in the practical case*

As will be seen from the table, the power K must have a maximum near $R=0$. Therefore, for small values of R one can approximately say:

$$K=\frac{b\mu_0(IN)^2}{2\cdot l}\cdot\frac{\log\frac{R+L}{R}}{\left(\frac{2b}{\mu A_j}D\cdot\log\frac{R+L}{R}+\frac{\delta}{l}\right)^2}$$

and determine the maximum of this function. The result then will be that $K_{max}=7.27$ newtons for $R=0.00075\cdot10^{-3}$ meters, that is close to zero (compare Fig. 3*b*). The approximation made in the equation for determining K according to Example III, vit. $R=0$, is thus justified.

For practical measurements the maximum of the force K is found to lie at values for R of about $2\cdot10^{-3}$ meters. This partly is due to the fact that the flux of leakage from the underside of the armature, when the values for R are small, impinges upon the magnet core beyond the turning axis of the armature and thereby gives rise to a moment which is directed against the principal moment, and partly because in practice there always remains a certain air gap (compare the curve K' in Fig. 6). When greater values for R are concerned, the two moments cooperate.

VII. *Determination of the force K as a function of the permeability* $\mu$

For a distance $R=3\cdot10^{-3}$ the force K has been calculated as a function of the permeability $\mu$. The result will be seen from the following table and Fig. 4.

| | | | | | | | | |
|---|---|---|---|---|---|---|---|---|
| $\mu$ | 0 | 1,000 | 2,000 | 3,000 | 4,000 | 5,000 | 6,000 | ∞ |
| K | 0 | 1.75 | 3.02 | 3.77 | 4.23 | 4.57 | 4.82 | 6.39 |

As will be seen from Fig. 4, the course of the curve is relatively flat when the values for $\mu$ are of higher order. Thus, a change of the permeability from 4000 to 6000 (vit. 50%) will result in an increase of the lifting force from 4.2 to about 4.8. It is easy to show that the stated increase of the force can be alternatively effected by increasing the ampere turns from 175 to about 187 A. T., the permeability remaining at 4000.

It is obvious that the use of special materials in the magnetic circuit generally is not a suitable solution.

VIII. *Determination of the lifting force K' (at neglected action from the iron circuit) as a function of the distance R for the case where the reluctance of the iron circuit is neglected*

For sake of comparison a force K' has been calculated for a relay having the same data as that employed in Example V.

The values have been obtained from the formula given in Example IV and will be seen from the table below and from Fig. 3*a*. (The curve indicated by dashed lines shows the force K'.)

| R | K' |
|---|---|
| 0 | ∞ |
| $0.1\cdot10^{-3}$ | 14.8 |
| $0.5\cdot10^{-3}$ | 10.5 |
| $1\cdot10^{-3}$ | 8.7 |
| $2\cdot10^{-3}$ | 7.2 |
| $5\cdot10^{-3}$ | 5.6 |
| $10\cdot10^{-3}$ | 4.6 |
| $20\cdot10^{-3}$ | 4.0 |
| $30\cdot10^{-3}$ | 3.8 |
| ∞ | 3.15 |

As will be seen (Fig. 3*a*) the values for the forces K' and K differ so much that it is permissible to neglect the reluctance the iron circuit only when approximate calculations of the lifting force are required.

IX. *Calculation of certain dimensions of a relay using the equation for the force K according to Example III*

The calculation is carried out with a relay, which when the ampere turns IN are 175 A. T. develops a lifting force $K=425$ gms.

In accordance with the formula obtained in Example III, relay constructions can be improved in different respects. It may for instance be desirable to reduce the amount of material in the iron circuit, when otherwise the values for $\mu$, IN and K are unchanged.

Alternatively, the aim may be to reduce the ampere turns IN as much as possible, the above data as to $\mu$, K, and the amount of material in the iron circuit being fixed.

When weak current systems are involved, the use of material, the permeability, and the lifting force of the lifting studs of the contact spring group are given, as regards the electromagnetic relays which are included in such a system. However, heretofore there has been no definite rule available, how a minimum of the ampere turns IN is simultaneously obtained.

The condition for a minimum of ampere turns IN is deduced from the expression for the force according to Example III.

$$K=\frac{b\mu_0(IN)^2}{2(R+l}\;\frac{\log\frac{R+L}{R}}{\left[\frac{2b}{\mu A_i}(D+L_1)\cdot\log\frac{R+L}{R}+\frac{\delta}{R+L}\right]^2}$$

From this $(IN)^2$ is derived.

$$(IN)^2=\frac{2K}{b\mu_0(R+l)\log\frac{R+L}{R}}\left[\frac{2b(D+L_1)}{\mu A_i}(R+l)\log\frac{R+L}{R}+\delta\right]^2$$

$(IN)^2$ is derived in respect of $$(R+l)\log\frac{R+L}{R}$$

the derivate being put equal with O, whereby the following condition for minimum is obtained:

$$(R+l)\log\frac{R+L}{R}=\frac{\mu A_i\cdot\delta}{2b(D+L_1)}$$

which gives:

$$(IN)^2\text{ min.}=\frac{16K\delta(D+L_1)}{\mu\mu_0A_i}$$

It can be seen from the last mentioned equation for $(IN)^2$, that for given values for K, $\delta$, and $\mu$, the cross-sectional area $A_j$ of the core ($=b\cdot h$ according to Fig. 7) should be chosen as large as possible, and the paths of the lines of force in the iron $S_j=2(L-L_1)$ as short as possible in order to obtain as small a value as possible for IN.

The equation defining the conditions for obtaining minimum ampere turns is more general than is indicated above. It is obvious that the conditions for minimum are true not only for IN but also for $$\frac{(IN)^2}{K}$$

For a given value of IN the lifting force K thus has its maximum when the relay dimensions are calculated according to the equation obtained for $(IN)^2$ min.

The next problem is how to achieve the desired minimum when using the available quantity of material. Furthermore, space must be left for the winding, and the leakage between the different portions of the relay must be kept at a low value.

Thus, the geometrical quantities occurring in the formulas set forth above, must be chosen so that certain demands as to space are satisfied. To the amount of material required for the magnetic function intended, a certain amount of material must be added, as shown above, which is needed to comply with the mechanical requirements. The path of the lines of force through the outer branch 1 of the core is concentrated within an area around the turning axis of the armature 4. The portions of the outer branch 1 located in front of this turning axis is magnetically inoperative. Consequently, in regard to the magnetic action the branch need not be longer than about half the length shown, that is, it needs to extend only to the turning axis of the armature. However, for various mechanical-constructive reasons, such as the mounting of the contact spring group in the longitudinal direction of these branches 1, 2 (as indicated in Fig. 2), the pivotal mounting of the armature on the underside of the branches, and the necessary space in lateral direction for the winding (for example winding 9 in Fig. 7), the branches must have a certain length in excess of that necessary for magnetic reasons only. The compromise between the magnetic and the mechanical demands for dimensioning that must be made for practical use has been found to be a length (*g*) of the outer branches of the core which is at most 80% of the length $(e)$ of the central branch; for certain particularly advantageous practical constructions of the relay 60% are sufficient.

While it has been found to be impossible to satisfy all these conditions simultaneously, it is possible to arrive at an approximate solution by applying the following rules:

(1) $b>h$ ($b$ being one side of the cross-sectional area $A_j$ which is substantially at right angles to the direction of operation of the force K),
(2) $f \geqq e$
(3) $e>80\%\ g$
(4) By placing the winding on the transverse portion of the core.

In a relay comprising several active branches which together with the armature form active airgaps, and one or more passive branches, the sum of the width of the active branches is greater than half the sum of the width of the passive branches, and said sum may also be greater than the sum of the height of these branches divided by the number of branches.

A minimum value for IN will be obtained in a practical case with reference to Fig. 1 and using the equation for $(\mathrm{IN})^2_{\mathrm{min.}}$ in Example IX:

$$a=36\cdot10^{-3}\text{ m.}$$
$$b=24\cdot10^{-3}\text{ m.}$$
$$c=30\cdot10^{-3}\text{ m.}$$
$$h=3.0\cdot10^{-3}\text{ m.}$$
$$d=2.5\cdot10^{-3}\text{ m.}$$
$$R=2.0\cdot10^{-3}\text{ m.}$$

$$L_1=R\cdot\left[\sqrt{1+\frac{L}{R}}1\right]$$

$$K=4.16\text{ newtons}$$
$$\delta=0.8\cdot10^{-3}\text{ m.}$$
$$\mu=4\cdot10^{-3}\text{ m.}$$
$$L=30\cdot10^{-3}\text{ m.}$$
$$l=29\cdot10^{-3}\text{ m.}$$
$$\mu_0=4\pi\cdot10^{-7}$$

the result being $$\left.\begin{array}{l}D=38.75\cdot10^{-3}\text{ m.}\\L_1=6.00\cdot10^{-3}\text{ m.}\end{array}\right\}D+L=44.75\cdot10^{-3}\text{ m.}$$

$$A_j=72\cdot10^{-6}\text{ m.}^2$$

According to the equation for $(\mathrm{IN})^2$ the result is:

$$\underline{(IN)_{\mathrm{min.}}=81.3\text{ A. T.}}$$

but the condition for a mathematical minimum is not exactly fulfilled in practice.

For the adopted data the following theoretical result is obtained:

$$(R+l)\log\frac{R+L}{R}=86.3\cdot10^{-3}$$

and $$\underline{\underline{IN=81.8\text{ A. T.}}}$$

Thus, the practical value is reasonably close to the mathematically calculated extreme value for IN.

The result is that by application of the formula of the invention according to Example III (the values for the use of material, the permeability, and the force being maintained) produces a reduction of the ampere turns from 175 A. T. to 82 A. T., that is a reduction of 53%. This reduction demonstrates the practical usefulness of the new formula as per Example III.

When it is desired to maintain the number of ampere turns: $IN=175$ A. T., and instead to obtain as large a force $K_2$ as possible, the following result is obtained from the equation for the lifting power:

$$K_2=4.16\cdot\left(\frac{175}{82}\right)^2=18.95\text{ n.}=1903\text{ gms.}$$

The lifting power is in this case 4.55 times greater than in the previous case (425 gms.).

The reason why the practical dimensioning of the distance R between the operative part of the armature and its turning axis differs from the calculated theoretical value is as follows: A part of the magnetic flux leaves the underside of the armature (for example the armature 4 in Fig. 1) and passes from there to the central branch of the core. When the distance (R) is small, some of this flux will impinge upon the central branch of the core behind the turning axis of the armature, whereby the flux of leakage gives rise to a torque which is directed opposite to the mechanically acting torque. The result is the lifting force acting upon the lifting studs. Owing to this, the distance (R) between the rear edge and the turning axis of the armature must be made considerably larger than the theoretical value $(0.00075\times10^{-3}$ m.) according to the curve representing K in Fig. 6, for instance $2\times10^{-3}$ m. However, the distance R between the armature and its turning axis should be not more than at most 60%, for example 50% of the whole length $(R+L)$ of the armature.

X. *Calculation of the lifting force K in a relay with a composite air gap as per Fig. 5*

To facilitate the separation of the armature it is sometimes desirable to provide an air gap remaining between the armature and the central branch of the core, when the relay is in operative position. Such remaining air gap is obtained by bending the central leg in relation to the branches. The air gap is in such case composed of a variable portion $\alpha_1$ and a stationary portion $\alpha_2$. The calculation of the force $K_1$ is analogous to that of the previous case, in which the variable part of the air gap only was considered. The following result is obtained.

$$K_1=\frac{b\mu_0(IN)^2}{2(R+l)}\cdot\frac{\log\frac{R'+L}{R'}-\frac{(R'-R)L}{R'(R'+R)}}{\left[\frac{2b(D+L_1')}{\mu A_j}\log\frac{R'+L}{R'}+\alpha_1+\alpha_2\right]^2}$$

in which $S$=the distance between the bending axis of the central leg and the rear edge of the armature when $\alpha_1=0$, $$R'=\frac{R\alpha_1+S\alpha_2}{\alpha_1+\alpha_2}$$

$$L_1^1=\sqrt{R^1(R^1+L)}-R^1$$

By inserting in the expression for $K_1$ the same numerical values as above and for $\alpha_1=0.758\cdot10^{-3}$, $\alpha_2=1\cdot10^{-3}$, and for $S=44\cdot10^{-3}$, $K_1$ is obtained as a function of R according to the table below and Fig. 6.

The curve K has been included in Fig. 6 for comparison with the curve $K_1$ according to the following table, the curve representing the conditions when the reluctance of the iron circuit is neglected.

| R | $K_1$ |
|---|---|
| 0 | 3.68 |
| $0.1\cdot10^{-3}$ | 3.77 |
| $0.5\cdot10^{-3}$ | 3.85 |
| $1\cdot10^{-3}$ | 3.88 |
| $2\cdot10^{-3}$ | 3.75 |
| $5\cdot10^{-3}$ | 3.41 |
| $10\cdot10^{-3}$ | 3.15 |
| $20\cdot10^{-3}$ | 2.88 |
| $30\cdot10^{-3}$ | 2.79 |

There is still another reason for selecting R larger than the theoretical value obtained from the respective equation for K. In the practice, the air gap always forms some angle $\alpha_2$, as the armature plate and the core respectively cannot be made entirely plane. Hence, the angle $\alpha_1=0$ applies to the theoretical case only. However, according to the equation in Example X, the lifting force $K_1$ is also dependent on the stationary part $\alpha_2$ of the air gap and respectively the distance R and the length $(R+L)$ of the armature. Hence, to obtain the desired maximum for the lifting force $K_1$ in the case of a practical construction, the distance R must be selected at a suitable relationship to the whole length $(R+L)$ of the armature.

XI. *Control of calculated values through measuring*

Control measurements on an unloaded flat armature relay with a distance $R=3\cdot10^{-3}$, have shown that 30 ampere turns are required to overcome frictional resistance and counter moments caused by the weight of the armature. The same relay must have 200 ampere turns to lift maximum 400 grams that is, to obtain the lifting force necessary for lifting by means of lifting studs the maximum number of contact springs in a group of contact springs conceivable in the practice. The maximum lifting force of the lifting stud has been stated as 400 grams giving a contact pressure of ~25 grams per spring with a group of contact springs consisting of $2\times7=14$ contact springs and a margin of about 15%. The number of ampere turns IN active in the lifting operation thus amounts to 170. As the force K is proportional to the square of IN, a relay with 175 ampere turns will be able to lift:

$$400\cdot\left(\frac{175}{170}\right)^2=424 \text{ grams}$$

The quantity of material required for the armature and the core amounts to 10,500 mm.[3], and the permeability of the iron is $\mu=4000$.

According to Fig. 3*a*, the corresponding theoretical value of the force will be 4.25 newtons=434 gms. However, in the above calculations the leakage has been neglected. When in a practical case the leakage is calculated to amount to 10%, the factor 0.9 must be placed before $\mu$ in the expression for K. The force corrected in this way will be 4.10 newtons=419 gms., while the really measured force as per above is 424 gms.

XII. *The embodiments according to Figs. 10–13*

For practical reasons it is often desirable to reduce the lateral width of a relay. This is effected by placing one of the outer branches of a core, for example as shown in the embodiment of Fig. 7, upon the other outer branch. As a result, the relay obtains the appearance of Fig. 10.

In Fig. 7 a relay core is shown comprising two outer branches 7 and a central leg 6 and a yoke 8 carrying a winding 9. The central leg 6 has a width *b* and a height *h* and a length *e*, whereas the length of each outer branch is *g*. The width of the yoke is *f*.

The corresponding armature 10 is shown in Fig. 8, whereby 11 represents the central portion or leg and 12 represents the outer portions or legs of the armature.

The relay is shown in side view in Fig. 9 wherein 13 represents a holding means for maintaining the armature 10 against the core. 14 is an adjusting screw and $\delta$ represents the airgap between the outer left hand ends of parts 6 and 10.

In Figs. 10 and 11 is shown a relay obtained when modifying the relay of Figs. 7 to 9 in the above suggested manner. In this connection it is more adequate to introduce other expressions instead of the definitions "central branch," and "outer branch" of the core used in connection with the previous embodiments, such as, for example "active branch," and "passive branch." An "active branch" is a branch of the core, no point of which is in magnetic contact with the armature when the latter is in its released position. The force required for the lifting operation of the relay is generated in the air gap between the underside of the branches and the armature. An "outer branch or passive branch" is a branch of the core, which is in permanent magnetic contact with those parts of the armature which constitute the turning axis of the armature. Owing to this contact, a magnetic short circuit occurs and no part of the flux theoretically passes through the air gap between the underside of the passive branch and the armature.

In the example of Fig. 10 reference numeral 15 designates the active branch and 16 designates the passive branch. The coil winding is designated by 17. The designations of the dimensions are the same as before, that is, $b$=the width of the branch, $e$=the length of the active branch, $g$=the length of the passive branch, and $f$=the length of the transverse part of the core.

In Fig. 11 an armature 18 is shown, R being the distance between the armature and its turning axis, while L is the active length of the armature.

A symmetrical relay built in accordance with the same principle is shown in Fig. 12. The relay of Fig. 12 is developed from the one according to Fig. 10 by dividing the active branch into two halves, each having a width of $b/2$, $b$ being the total width of the active branches. The two halves are situated on both sides of the passive branch. The total width $(b/2+b/2)$ of the active branches is in an approximate relationship to the height $h$ such as 7 to 1.

In Fig. 12 the reference numeral 19 designates the passive branch of a core, and 20 designates the active branches. The coil windings encompassing the passive branch 19 are designated by 21. The designations of the dimensions are the same as before, $b/2$=half the width of the active branches 20.

Fig. 13 shows an associated armature 22.

The invention has been described above in connection with certain embodiments of flat armature relays, but it may also be applied to relays of other constructions.

What is claimed is:

1. A magnetic relay circuit comprising a magnet core having at least two branches, a coil means, a pivotally mounted armature forming a variable air gap with the core, said armature having a main portion and at least one arm portion, the length of the arm portion of the armature, the length of the main portion of the armature, the distance between the pivot axis of the armature and the point of contact of the outer forces acting upon the armature, the air gap, the permeability of the magnetic material used in the magnetic circuit, the cross-sectional area of the core at a right angle to the direction of the magnetic lines of force and the width of the core being correlated in accordance with the equation:

$$(R+l)\log\frac{R+L}{R}=\frac{\mu A_i}{2b(D+L_1)}$$

where R is the length of the arm portion of the armature, L the length of the main portion of the armature, $(R+l)$ the distance between the pivot axis of the armature and the point of attack of the outer force acting upon the armature, $\delta$ the maximum air gap between the armature and the core, $\mu$ the permeability of the magnetic material, $A_j$ the cross-sectional area of the core at right angles to the direction of the magnetic lines of force, $b$ the width of the core, and $(D+L_1)$ half the paths of the length of the lines of force in the magnetic material for selectively providing a maximum lifting force of the armature for a given number of ampere turns of the coil means and a minimum number of ampere turns for a given lifting force respectively.

2. A magnetic relay circuit according to claim 1, wherein the lifting force of the armature and the dimensions of the aforesaid components of the relay are in accordance with the equation $$K=\frac{b\mu_0(IN)^2}{2(R+l)}\cdot\frac{\log\dfrac{R+L}{R}}{\left[\dfrac{2b}{\mu A_i}(D+L_1)\cdot\log\dfrac{R+L}{R}+\dfrac{\delta}{R+l}\right]^2}$$

where K is the lifting force of the armature, IN the number of ampere turns required, and $\mu_0$ a constant.

3. A magnetic relay circuit according to claim 1, wherein for a given quantity of relay material and for a given lifting force the minimum value of the number of ampere turns and respectively for a given number of ampére turns the maximum value of the lifting force is determined by the equations $$(IN)_{\text{min.}}=\sqrt{\frac{16K\delta\cdot(D+L_1)}{\mu\mu_0 A_j}};\ K_{\text{max.}}=\frac{\mu\mu_0 A_j(IN)^2}{16\delta\cdot(D+L_1)}$$

where K is the lifting force of the armature, IN the number of ampere turns, and $\mu_0$ a constant.

4. A magnetic relay circuit according to claim 1, wherein the core comprises several active branches forming active air gaps with the armature, and at least one passive branch, the sum of the width of the active branches being greater than half the sum of the width of the passive branch.

5. A magnetic relay circuit according to claim 4, wherein the sum of the width of the active branches is greater than the sum of the height of said branches divided by the number of branches.

6. A magnetic relay circuit according to claim 1, wherein the length of the arm portion (R) of the armature is at most 60% of the distance between the pivot axis of the armature and the point of attack of the outer force acting upon the armature $(R+L)$.

7. A magnetic relay circuit according to claim 1, wherein the length of each passive branch of the core is at most 90% of the length of the active core branches.

8. A magnetic relay circuit according to claim 1, wherein the cross-sectional area of the branches of the core is rectangular.

9. A magnetic relay circuit according to claim 8, wherein the long side of said cross-sectional area is the side (*b*) which forms a substantially right angle with the direction of lifting of the armature.

10. A magnetic relay circuit according to claim 1, wherein the arm portion of the armature is in direct contact with branches of the core other than those forming active air gaps with the armature, said branches being passive branches.

11. A magnetic relay circuit according to claim 1, wherein said core comprises two active branches and one passive branch, each active branch forming an active air gap with the armature, and wherein said armature is a flat armature, said passive branch being located symmetrically in relation to the active branches.

12. A magnetic relay circuit according to claim 11, wherein the sum of the width of the active branches is greater than half the width of the passive branch.

References Cited in the file of this patent

UNITED STATES PATENTS

| | | |
|---|---|---|
| 972,814 | Cadell | Oct. 18, 1910 |
| 1,812,545 | Nilson | June 30, 1931 |
| 2,693,554 | Vigren et al. | Nov. 2, 1954 |